United States Patent [19]
Thompson

[11] 3,953,346
[45] Apr. 27, 1976

[54] TERTIARY DIAMIDE LUBRICANTS

[75] Inventor: Robert M. Thompson, Wilmington, Del.

[73] Assignee: Sun Ventures, Inc., St. Davids, Pa.

[22] Filed: Oct. 17, 1974

[21] Appl. No.: 515,775

Related U.S. Application Data

[63] Continuation-in-part of Ser. No. 293,981, Oct. 2, 1972, abandoned.

[52] U.S. Cl............................ 252/51.5 A; 252/403
[51] Int. Cl.² ..................... C10M 1/32; C10M 3/26; C10M 5/20; C10M 7/30
[58] Field of Search...................... 252/51.5 A, 403

[56] References Cited
UNITED STATES PATENTS
3,312,620   4/1967   Low et al....................... 252/51.5 A

*Primary Examiner*—Delbert E. Gantz
*Assistant Examiner*—I. Vaughn
*Attorney, Agent, or Firm*—Donald R. Johnson; J. Edward Hess; Anthony Potts, Jr.

[57] ABSTRACT

Disclosed are novel synthetic lubricants containing major amounts of tertiary diamides having the following structural formula:

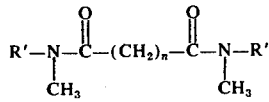

wherein
n = 4–12

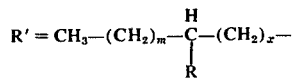

wherein
R = H, alkyl radical having $C_1$–$C_5$
m = 2–8
x = 1–5

These lubricants have low pour points and excellent thermal stabilities.

12 Claims, No Drawings

TERTIARY DIAMIDE LUBRICANTS

CROSS REFERENCE TO RELATED APPLICATIONS

This application is a continuation-in-part of application Ser. No. 293,981, filed Oct. 2, 1972, now abandoned. The latter is related to those described in the following listed applications:

| Serial Numbers | Inventors |
| --- | --- |
| 293,979 | R. M. Thompson |
| 293,980 | R. M. Thompson |
| 293,982, | R. M. Thompson |
| now U.S. Pat. No. 3,827,981 | |
| 293,983, | R. M. Thompson and |
| now U.S. Pat. NO. 3,827,980 | A. F. Talbot |
| 293,984, | R. M. Thompson and |
| now abandoned | F. E. Didot |

All of the aforementioned applications filed the same date as Ser. No. 293,981. The first and second of the aforementioned applications relate to classes of novel diamides; the third relates to the use of certain tertiary diamides as lubricants; the fourth to the use of certain tertiary diamides in greases and the last one to the use of certain tertiary diamides as swelling agents.

SUMMARY OF THE INVENTION

This invention pertains to novel synthetic lubricants containing a major amount of tertiary diamides having the formula:

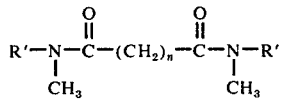

wherein
$n = 4-12$

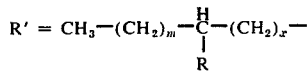

wherein
R = H, alkyl radical having $C_1-C_5$
$m = 2-8$
$x = 1-5$ and a minor amount of lubrication additives. These liquid lubricants have low pour points despite their high kinematic viscosities and high boiling points. This invention also relates to a method of lubrication.

BACKGROUND OF THE INVENTION

Stringent and specific lubrication requirements of modern technology, such as high thermal and oxidative stability and suitable physical properties over a wide temperature range, have spurred on the development of new synthetic lubricants having a particular advantage in that their physical properties can be regulated by the proper choice of structure. A wide number of synthetic lubricants have found acceptance in industrial and military application. A comprehensive discussion of these synthetic lubricants and their application is given in Kirk-Othmer, *ENCYCLOPEDIA OF CHEMICAL TECHNOLOGY*, 2nd, Edition, Volume 12. In addition, U.S. Pat. No. 3,312,620, H. Low and J. E. Lauck, Apr. 4, 1967, relates to the use of certain N,N-disubstituted amides as synthetic lubricant base stocks. However, the aforementioned lubricants cannot satisfy all the needs of modern technology, particularly where there is a need for high boiling point lubricants having a high kinematic viscosity, a low pour point, and thermal and oxidative stability.

DESCRIPTION OF THE INVENTION

It has now been discovered that certain tertiary diamides are effective lubricant base stocks. These diamides have the following structural formula:

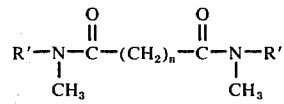

wherein
$n = 1-12$

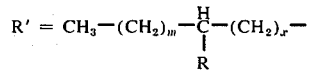

wherein
R = H, alkyl radical having $C_1-C_5$
$m = 2-8$
$x = 1-5$

Representative tertiary diamides of the invention are N,N'-dimethyl-N,N'-dihexylazelamide, N,N'-dimethyl-N,N'-dioctylazelamide, N,N'-dimethyl-N,N'-di-2-ethylhexylazelamide and N,N'-dimethyl-N,N'-di-2-ethylhexylsebacamide.

The tertiary diamides of this invention can be prepared by reacting a normal paraffinic diacid with a secondary amine wherein one radical is a methyl. This general reaction is illustrated by the following equation:

(1) 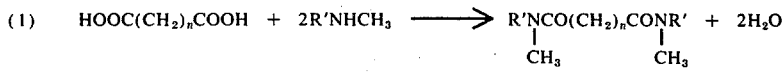

The normal paraffinic diacid or equation (1) can contain 6–14 carbon atoms; preferably 8–12. Accordingly $n$ of the diacid of equation (1) equals 4–12, preferably 6–10. Examples of such acids are suberic, azelaic and sebacic. The secondary amine of equation (1) contains a methyl and R'. The latter,

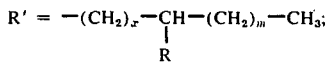

wherein $x = 1-5$; $R = H$ or an alkyl radical containing $C_1-C_5$ and $m = 2-8$. A preferred R' is one wherein $x = 1$; more preferably $x = 1$ and $R = H$ and $m = 3-6$. Preparation of primary and secondary amines and the physical and chemical properties of the amines are given in Kirk-Othmer, *ENCYCLOPEDIA OF CHEMICAL TECHNOLOGY*, 2nd Edition, Volume 2, Amines (Survey).

Another method involves reacting a normal paraffinic diacyl halogen, e.g. a diacyl chloride, with a secondary amine wherein one radical is a methyl. This general reaction is illustrated by the following equation:

(2)  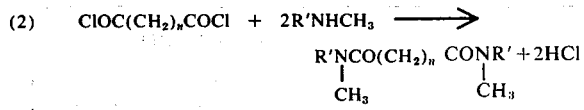

In equation (2) $n$, as in equation (1), equals 4–12; preferably 6–10. R' is the same as in general equation (1).

The present invention contemplates the use of these compounds and mixtures thereof as base lubricants, i.e. a major proportion (a least half) of the lubricant comprises the above defined tertiary diamides. It is preferred that amides of the invention comprise at least 75%, preferably at least 90% by weight of the final lubricant composition. The balance of the lubricant contains minor amounts of additives. These additives include oxidation inhibitors, rust inhibitors, antiwear agents, detergent-dispersants and foam inhibitors. These additives are described in Kirk-Othmer, *ENCYCLOPEDIA OF CHEMICAL TECHNOLOGY*, 2nd Edition, Volume 12, Lubrication and Lubricants.

The present invention is partly based on the discovery that the tertiary diamides of present invention have, compared to N,N'-disubstituted amides such as N,N'-di-n-propylbenzamide, low pour points despite their high boiling points and high kinematic viscosities, particularly at 100°F. Furthermore, the tertiary diamides have high positive viscosity indexes compared to the negative viscosity indexes for the disubstituted aromatic amides. These substantial differences are apparent via a comparison of the data relating to the tertiary diamides and the disubstituted aromatic amide shown in the accompanying Table I.

Also, the present invention is partly based on the tertiary amides' unique combination of kinematic viscosity and pour point compared to the same properties of petroleum lubricating oils and synthetic oils. Thus, for example, as shown in the accompanying Table II, a petroleum lubricating oil (SAE 40) has a similar kinematic viscosity at 100°F as the last tertiary diamide shown; yet the petroleum oil has a 0°F pour point whereas the diamide has a much lower pour point; i.e., −35°F.

On the other hand, while a synthetic oil has much lower pour point than the tertiary diamides, e.g. −75°F versus −35° to −45°F, respectively, the diamides have kinematic viscosities which are much higher. Thus, the tertiary diamides have kinematic viscosities and pour points which can meet unique industrial lubricating requirements.

Another advantage of the lubricants of the present invention is their excellent thermal and oxidative stability. For example, no sludge was found in a sample of N,N'-dimethyl-N,N'-dihexylazelamide after being maintained at 300°F for three days.

The lubricants of present invention can be used wherever it is desirable to separate moving surfaces to minimize friction and wear. In particular, the lubricants, because of their extremely high boiling points, are useful in high temperature environments and yet, because of their low pour points, can also be used in a low temperature environment. Engines, particularly internal combustion engines, e.g. gasoline engines, are exposed to such low-high temperature environments.

Following are several examples of how the synthetic lubricants of present invention were prepared. Also shown are comparative examples.

EXAMPLES

1. Preparation of N,N'-Dimethyl-N,N'-Dioctylazelamide 30 grams of azelic acid and 45.7 grams of N-methyl-N-octylamine were charged to a three-neck flask equipped with a magnetic stirring bar thermometer, Dean Stark trap condenser and nitrogen inlet. The resulting mixture in the flask was heated to 180°–190°C, with stirring, and maintained at that temperature until no more water, a reacton by-product, comes over into the Dean Stark trap.

Afterwards, the heating was stopped, the flask and its contents were allowed to cool. After cooling 150 milliliters of ether were added to the contents in the flask, and then the ether solution was first washed with a dilute HCl solution, then washed with a 10% aqueous $Na_2CO_3$ solution and then washed with just water. Any water in the ether solution was removed by contacting the solution with $MgSO_4$. Afterwards, the ether was removed by application of a vacuum. The product was a slightly yellowish, oily appearing liquid. Its kinematic viscosities were 45.95 centistokes at 100°F and 6.86 centistokes at 210°F.

The aforementioned yellowish product was then distilled using a highly efficient, low holdup distillation column. Its boiling point was 176°C at 0.17 mm Hg. 45 grams of a water-white, oily appearing liquid was obtained. The kinematic viscosities of the water-white product were 50.99 centistokes at 100°F and 7.336 centistokes at 210°F. Its ASTM viscosity index was 115; its pour point was −35°F. The weight percent nitrogen of the product measured 5.16% compared to a calculated 4.9 weight % for $C_{18}H_{37}NO$. The product had a density of 0.9174 at 25°C; its refractive index $\eta_D^{20}$, was 1.4557.

2. Preparation of N,N'-Dimethyl-N,N'-Di-2-Ethyl-hexylazelamide 45 grams of a yellowish, oil appearing liquid were obtained from the reaction of 38.6 grams of azelaic acid and 59.6 grams of N-methyl-N-2-ethyl-hexylamine via, in general, the procedure detailed for the aforementioned dioctylazelamide. The yellowish liquid of this preparation was not distilled. The kinematic viscosities of the yellowish liquid were 109.7 centistokes at 100°F and 10.03 centistokes at 210°F. Its ASTM viscosity index was 73. The yellowish color was believed to be caused by traces of impurities. The infrared absorption bands of the product were typical of tertiary amides; also no amine or carboxyl absorption bands were present. The weight percent nitrogen of the product measured 5.16% compared to a calculated 6.6% for $C_{27}H_{54}N_2O_2$. Its refractive index, $\eta_D^{20}$ was 1.4764. The product's boiling point was 220°C at 0.7 mm Hg.

3. Preparation of N,N'-Dimethyl-N,N'-Di-2-Ethylsebacamide 20 grams of a yellowish, oily appearing liquid were obtained from the reaction of 38 grams of sebacic acid and 25 grams of N-methyl-N-2-ethylhexylamine via the procedure detailed for the aforementioned di-2-ethylhexylazelamide.

The infrared absorption bands of the yellowish product were typical of tertiary amides; also, no amine or carboxyl absorption bands were present. Its density was 0.9211 at 26°C; the weight of N measured 6.66% compared to a calculated 6.2% for $C_{28}H_{56}N_2O_2$; its refractive index, $\eta_D^{20}$, was 1.4760. The kinematic viscosities of the product were 163.8 centistokes at 100°F and 13.35 centistokes at 210°F. Its ASTM viscosity index was 80; its pour point was −35°F.

4. Preparation of N,N'-Dimethyl-N,N'-Dihexylazelamide 10.5 grams of azeloylchloride were placed in a container holding 140 milliliters of tetrachloroethylene and dissolved. To the resulting mixture were added 9.2 grams of N-methyl-N-hexylamine, and 1.6 grams of NaOH dissolved in 200 milliliters of water. The completed mixture was agitated for 10–15 minutes; afterwards the organic layer was separated, washed with a dilute aqueous HCl solution. Following this the organic layer was washed with a 10% aqueous $Na_2CO_3$ solution and then washed with water. The washed organic layer was dried by contacting with $MgSO_4$ and then the tetrachloroethylene was removed by application of a vacuum.

The resulting product, 5.2 grams, had a slightly yellow, oily appearance. The yellowish color was believed to be caused by traces of impurities. The infrared absorption bands of the product were typical of tertiary amides; also no amine or carboxyl absorption bands were present.

The kinematic viscosities of the resulting product were 53.64 centistokes at 100°F and 7.26 centistokes at 210°F. Its ASTM viscosity index as 104; its pour point was −45°F.

The resulting product was very thermally stable. It was placed in a container which was kept in a forced draft oven maintained at 300°F for three days. After three days, no sludge had formed so the test was stopped.

Other tertiary diamides, prepared with other diacids such as suberic, pimelic and adipic, and/or other secondary amines such as N-methyl-N-heptylamine, N-methyl-N-octylamine and N-methyl-N-nonylamine and/or other saturated aliphatic diacylhalogens such as suberoyl chloride, pimeloyl chloride and adipoyl chloride have analogous properties to those reported in the examples.

COMPARATIVE EXAMPLES

Preparation of N,N'-dipropyl-N,N'-dioctylazelamide was undertaken twice. Both undertakings failed. The first attempt at a reaction between $CH_3CH_2CH_2Br$ and an excess of $CH_2(CH_2)_7NH_2$ resulted an inseparable gelatinous mass that was not amenable to isolation of the products. The second attempt yielded a product which was distilled and its center cut redistilled. The twice-distilled product was mixed with dimethylazelate but no reaction took place. The latter indicated that the twice-distilled product was a tertiary material, i.e. $(CH_3CH_2CH_2)_2N(CH_2)_7CH_3$ rather than the desired $CH_3CH_2CH_2NH(CH_2)_7CH_3$. The former was subsequently confirmed by nitrogen determination.

Because of the foregoing, preparation of N,N'-dioctyl-N,N'-dioctylazelamide was undertaken. Surprisingly the preparation was successful and the resulting amide was tested as to its lubricating properties. The results were as follows: kinematic viscosity at 100°F - 5.216 cs, at 210°F - 1.724 cs; no determinable ASTM viscosity index; and a pour point of +70°F. Because of its unsatisfactory pour point and lack of a determinable viscosity index this amide would be an unsatisfactory lubricating material.

TABLE I

| | LUBRICATING PROPERTIES OF CERTAIN AMIDE FLUIDS | | | | |
|---|---|---|---|---|---|
| Tertiary Diamides of Present Invention | Boiling Points[1] °F at 760 mm Hg | Kinematic Viscosity, cs at 100°F | at 210°F | Viscosity Index ASTM | Pour Point °F |
| N,N'-dimethyl-N,N'-dihexylazelamide | — | 53.64 | 7.26 | 104 | −45 |
| N,N'-dimethyl-N,N'-dioctylazelamide | 752 | 45.95 | 6.86 | 115 | −35 |
| N,N'-dimethyl-N,N'-di-2-ethylhexylazelamide | 810 | 109.7 | 10.03 | 73 | — |
| N,N'-dimethyl-N,N'-di-2-ethylhexylsebacamide | — | 163.8 | 13.35 | 80 | −35 |
| Comparison with N,N-Disubstituted Aromatic Amide | | | | | |
| N,N-di-n-propylbenzamide | 572 | 11.57 | 2.15 | < 0 | −50 |

[1]These boiling points were converted from the boiling points at other pressures reported in the examples via calculations from vapor pressure data.

TABLE II

| VISCOSITY AND POUR POINT COMPARISON OF SEVERAL LUBRICATING OILS AND TERTIARY DIAMIDES | | | |
|---|---|---|---|
| | Kinematic Viscosity, cs | | Pour Point, °F |
| | 100°F | 210°F | |
| Petroleum Lubricating Oil (Automotive) SAE 10W | 40.7 | 6.35 | −25 |

TABLE II-continued

VISCOSITY AND POUR POINT COMPARISON OF SEVERAL LUBRICATING OILS AND TERTIARY DIAMIDES

| | Kinematic Viscosity, cs | | Pour Point, °F |
|---|---|---|---|
| | 100°F | 210°F | |
| SAE 30 | 121.2 | 12.29 | 0 |
| SAE 40 | 182.6 | 16.02 | 0 |
| SAE 50 | 251 | 19.77 | 0 |
| Synthetic Oil | | | |
| (Aircraft Turbine) | | | |
| MIL-L-7808-6 | 11.0 | 3.0 | −75 |
| Tertiary Diamide | | | |
| N,N'-Dimethyl-N,N'-Dioctylazelamide | 53.64 | 7.26 | −45 |
| N,N'-Dimethyl-N,N'-Di-2-Ethylhexylazelamide | | | |
| Before Distillation | 45.95 | 6.86 | −35 |
| After Distillation | 50.99 | 7.336 | — |
| N,N'-Dimethyl-N,N'-Di-2-Ethylsebacamide | 109.7 | 10.03 | — |
| N,N'-Dimethyl-N,N'-Dihexylazelamide | 163.8 | 13.35 | −35 |

The invention claimed is:

1. A lubricant composition comprising a major amount of at least one tertiary diamide having the formula:

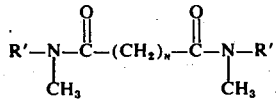

wherein
n = 4–12

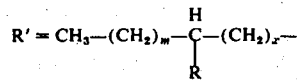

wherein
R = H, alkyl radical having $C_1$–$C_5$
m = 2–8
x = 1–5 and a minor amount of lubrication additive.

2. Composition according to claim 1 wherein the diamide is N,N'-dimethyl-N,N'-dihexylazelamide.

3. Composition according to claim 1 wherein the diamide is N,N'-dimethyl-N,N'-dioctylazelamide.

4. Composition according to claim 1 wherein the diamide is N,N'-dimethyl-N,N'-di-2-ethylhexylazelamide.

5. Composition according to claim 1 wherein the diamide is N,N'-dimethyl-N,N'-di-2-ethylhexylsebacamide.

6. A method of lubrication which comprises maintaining next to the surface to be lubricating a film of lubricant containing a major amount of at least one tertiary diamide having the formula:

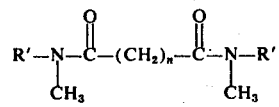

wherein
n = 4–12

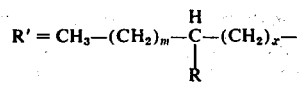

wherein
R = H, alkyl radical having $C_1$–$C_5$
m = 2–8
x = 1–5 and a minor amount of a lubrication additive.

7. Method according to claim 6 wherein the surface to be lubricated is a surface related to an internal combustion engine.

8. Method according to claim 7 wherein the internal combustion engine is a gasoline engine.

9. Method according to claim 8 wherein the diamide is N,N'-dimethyl-N,N'-dihexylazelamide.

10. Method according to claim 8 wherein the diamide is N,N'-dimethyl-N,N'-dioctylazelamide.

11. Method according to claim 8 wherein the diamide is N,N'-dimethyl-N,N'-di-2-ethylhexylazelamide.

12. Method according to claim 8 wherein the diamide is N,N'-dimethyl-N,N'-di-2-ethylhexylsebacamide.

* * * * *